(12) United States Patent
Mayrand

(10) Patent No.: US 10,145,355 B2
(45) Date of Patent: Dec. 4, 2018

(54) GAS-LIQUID TURBINE AND METHOD OF DRIVING SAME

(71) Applicant: Bioturbine Systems Inc., Ville Saint-Laurent (CA)

(72) Inventor: Paul Mayrand, Ville Saint-Laurent (CA)

(73) Assignee: Bioturbine Systems Inc., Ville-Saint-Laurent (CA)

( * ) Notice: Subject to any disclaimer, the term of this patent is extended or adjusted under 35 U.S.C. 154(b) by 123 days.

(21) Appl. No.: 15/201,569

(22) Filed: Jul. 4, 2016

(65) Prior Publication Data

US 2018/0003149 A1 Jan. 4, 2018

(51) Int. Cl.
*F03B 17/02* (2006.01)

(52) U.S. Cl.
CPC ........ *F03B 17/02* (2013.01); *F05B 2210/401* (2013.01); *F05B 2220/602* (2013.01); *F05D 2210/41* (2013.01); *F05D 2240/91* (2013.01)

(58) Field of Classification Search
CPC .. F03B 17/02; F05D 2240/91; F05D 2210/41; F05B 2240/24; F05B 2250/141
USPC ............... 60/495–496, 648; 290/1 R; 415/92
See application file for complete search history.

(56) References Cited

U.S. PATENT DOCUMENTS

| | | |
|---|---|---|
| 551,165 A | 12/1895 | Janssen |
| 2,266,937 A | 12/1941 | Tark |
| 3,360,926 A | 1/1968 | Parr |
| 3,715,885 A * | 2/1973 | Schur ...................... F03B 17/02 60/496 |
| 3,860,355 A * | 1/1975 | Dell ........................ F03B 17/02 415/7 |
| 3,886,074 A | 5/1975 | Prosser |
| 3,907,454 A | 9/1975 | Punton |
| 3,932,273 A | 1/1976 | Torpey et al. |
| 3,934,964 A * | 1/1976 | Diamond ................ F03B 17/04 415/5 |
| 4,054,031 A | 10/1977 | Johnson |

(Continued)

FOREIGN PATENT DOCUMENTS

| | | |
|---|---|---|
| BE | 1002838 A3 | 6/1991 |
| CA | 984787 A | 3/1976 |

(Continued)

OTHER PUBLICATIONS

International Search Report for Application No. PCT/CA2009/000441, dated Jun. 29, 2009, 5 pages.

*Primary Examiner* — Jason Newton
(74) *Attorney, Agent, or Firm* — Borden Ladner Gervais LLP; Louis B. Allard

(57) ABSTRACT

A turbine that has a plurality of compartments. Each compartment has associated thereto a respective opening. Each opening defining a fluid communication path between an outside of the turbine and a respective compartment. The turbine also has a plurality of conduits. Each conduit connects a respective compartment to an adjoining compartment. Each conduit defines a fluid communication passageway between the respective compartment and the adjoining compartment. The turbine is configured for immersion in liquid and for powering by gas displacing some of the liquid out of one or more than one compartment. The present disclosure also describes a method of driving such a turbine.

13 Claims, 9 Drawing Sheets

(56) References Cited

U.S. PATENT DOCUMENTS

| | | | |
|---|---|---|---|
| 4,084,375 A | 4/1978 | Horvath | |
| 4,093,539 A | 6/1978 | Guarino | |
| 4,170,114 A * | 10/1979 | Pruett | F03B 7/00 60/496 |
| 4,196,590 A | 4/1980 | Fries | |
| 4,268,385 A | 5/1981 | Yoshikawa | |
| 4,326,132 A | 4/1982 | Bokel | |
| 4,363,212 A * | 12/1982 | Everett | F03B 17/02 415/5 |
| 4,498,294 A * | 2/1985 | Everett | F03B 17/02 415/7 |
| 4,522,714 A | 6/1985 | Thissen | |
| 4,742,242 A | 5/1988 | De Shon | |
| 4,805,406 A | 2/1989 | Grsetic | |
| 4,865,723 A | 9/1989 | De Shon | |
| 4,981,015 A | 1/1991 | Simpson | |
| 5,326,459 A | 7/1994 | Hlavach et al. | |
| 5,395,529 A | 3/1995 | Butler | |
| 5,407,578 A * | 4/1995 | Nathwani | C02F 1/006 210/150 |
| 5,555,728 A * | 9/1996 | Welch, Jr. | F01D 23/00 60/496 |
| 5,665,236 A | 9/1997 | Van Den Berg | |
| 6,106,716 A | 8/2000 | Berkman | |
| 6,195,991 B1 * | 3/2001 | De Shon | F03B 17/02 60/495 |
| 6,447,243 B1 | 9/2002 | Kittle | |
| 6,534,881 B1 | 3/2003 | Slavchev | |
| 6,631,613 B1 | 10/2003 | De Shon | |
| 6,764,275 B1 * | 7/2004 | Carr | F03B 17/04 415/1 |
| 6,769,253 B1 * | 8/2004 | Scharfenberg | F03B 17/02 60/495 |
| 6,773,585 B1 | 8/2004 | Troubounis et al. | |
| 6,798,081 B1 | 9/2004 | Brehob | |
| 6,949,191 B1 | 9/2005 | Petrone | |
| 6,990,809 B2 | 1/2006 | Abouraphael | |
| 7,083,720 B2 | 8/2006 | Miller | |
| 7,216,483 B2 * | 5/2007 | Takeuchi | F03B 17/02 60/495 |
| 8,006,493 B2 * | 8/2011 | Dinh | F03G 7/06 60/495 |
| 8,978,376 B1 * | 3/2015 | Pedziwiatr | F03B 17/02 60/496 |
| 9,097,242 B2 * | 8/2015 | Godwin | F03G 7/10 |
| 2003/0214589 A1 | 11/2003 | Shibutani | |
| 2005/0127678 A1 * | 6/2005 | Rea | F02M 31/125 290/1 R |
| 2005/0252206 A1 | 11/2005 | Holmevik et al. | |
| 2008/0135474 A1 | 6/2008 | Limcaco | |
| 2010/0095666 A1 * | 4/2010 | Brumfield | F03B 17/02 60/495 |
| 2010/0102567 A1 * | 4/2010 | Nash | F03B 17/02 290/54 |
| 2012/0131914 A1 * | 5/2012 | Gibson | F03B 17/02 60/496 |
| 2016/0146180 A1 * | 5/2016 | Borns | H02K 7/1807 290/1 R |
| 2018/0073484 A1 * | 3/2018 | Maynard | F03B 17/02 |

FOREIGN PATENT DOCUMENTS

| | | | |
|---|---|---|---|
| CA | 1273720 A | 9/1990 | |
| CA | 2125177 A1 | 6/1993 | |
| CA | 2284740 A1 | 10/1998 | |
| CA | 2387387 A1 | 11/2003 | |
| DE | 4029150 A1 | 4/1992 | |
| DE | 4105581 A1 | 9/1992 | |
| DE | 9215449 U1 | 1/1993 | |
| DE | 29500117 U1 | 3/1995 | |
| DE | 19730252 A1 | 1/1999 | |
| DE | 102005041899 A1 | 3/2007 | |
| EP | 0161077 A1 | 11/1985 | |
| EP | 1426615 A1 | 6/2004 | |
| EP | 1528254 A1 | 5/2005 | |
| FR | 342981 A * | 9/1904 | F03B 17/02 |
| FR | 1355149 A | 3/1964 | |
| FR | 2276479 A1 | 1/1976 | |
| FR | 2491154 A1 | 4/1982 | |
| FR | 2844308 A1 | 3/2004 | |
| FR | 2864174 A1 | 6/2005 | |
| FR | 2897902 A1 | 8/2007 | |
| GB | 2069619 A | 8/1981 | |
| GB | 2190965 A | 12/1987 | |
| GB | 2213533 A | 8/1989 | |
| GB | 2229228 A | 9/1990 | |
| GB | 2230058 A | 10/1990 | |
| GB | 2350159 A | 11/2000 | |
| GB | 2417526 A | 3/2006 | |
| WO | 9636810 A1 | 11/1996 | |
| WO | 2004053329 A1 | 6/2004 | |

* cited by examiner

GAS-LIQUID TURBINE AND METHOD OF DRIVING SAME

FIELD

The present disclosure relates generally to turbines. More particularly, the present disclosure relates to turbines submerged in liquid and powered by gas, as well as to methods of driving such turbines.

BACKGROUND

Turbines submerged in liquid and powered by gas are known and typically have multiple chambers formed around a hub. A gas source located below such a turbine produces gas that rises towards the turbine and penetrates into the chambers to displace liquid therefrom, which produces a buoyant force and torque, which cause the turbine to rotate. However, these turbines and gas sources are often limited in the amount of buoyant force and torque that can be produced.

Therefore, improvements in turbines are desirable.

SUMMARY

In a first aspect, the present disclosure provides a turbine. The turbine comprises a plurality of compartments. Each compartment has associated thereto a respective opening. Each opening defines a fluid communication path, i.e., a path along which or through which fluid can flow, between an outside of the turbine and a respective compartment. The turbine also comprises a plurality of conduits. Each conduit connects a respective compartment to an adjoining compartment. Each conduit defines a fluid communication passageway, i.e., a passageway along which or through which fluid can flow, between the respective compartment and the adjoining compartment. The turbine is configured for immersion in liquid and for powering by gas displacing some of the liquid out of one or more than one compartment.

In a second aspect, the present disclosure provides a system that comprises the turbine of the above noted first aspect. The system also comprises a gas source, which is to be located under the turbine to provide the gas to the turbine to displace water from the compartments to an outside of the turbine in order to drive the turbine. The system further comprises a implement coupled to the turbine.

In a third aspect, the present disclosure provides a method driving a turbine immerged in liquid. The turbine has a plurality of compartments. The method comprises receiving an amount gas in a compartment to displace a quantity of liquid out of the compartment. The method further comprises receiving another amount of gas at an aperture of a conduit connecting the compartment to an adjacent compartment. The other amount of gas received at the aperture of the conduit is to flow into the adjacent compartment and displace another quantity of liquid out of the adjacent compartment.

Having each compartment connected to its adjoining compartments i.e., having each compartment in fluid communication with its two adjoining compartments, provides a margin of operation for the turbine of the present disclosure. For instance, when the turbine is subjected, from time to time, to a mechanical load it cannot handle, the turbine will stop turning. Subsequently, a compartment of the immobile turbine located in the vicinity of a gas source will become filled with gas and some gas will also partially fill an adjoining compartment. If having the compartment or the compartment and the adjoining compartment filled with gas does not provide sufficient torque for the turbine to overcome the mechanical load (i.e. if the turbine does not start turning), the turbine will stay immobile and gas will continue to enter turbine and flow into additional compartments. Eventually, if the mechanical load of the turbine is not excessive, the turbine will start turning again under the torque developed by the turbine under the buoyancy force provided by the gas filling additional compartments of the turbine.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

The present disclosure provides a turbine, a system and a method of driving a turbine. The turbine comprises a plurality of compartments with each compartment being in fluid communication to an adjoining compartment through a conduit. The presence of the conduits allows air received in a compartment to flow in an adjoining compartment. This can allow, in comparison to prior art turbines, for a greater amount of air to enter the turbine and, in turn, allows for a greater buoyancy force to be applied to the turbine and for a greater torque to be applied by the turbine against a mechanical load. As such, when compared to known turbines, the turbine of the present disclosure has an improved margin of operation in that when subjected to a mechanical load that halts the turbine, it can have a greater number of compartments fill with air and develop a greater torque that can overcome the mechanical load and re-start the turbine turning.

Figure 1:
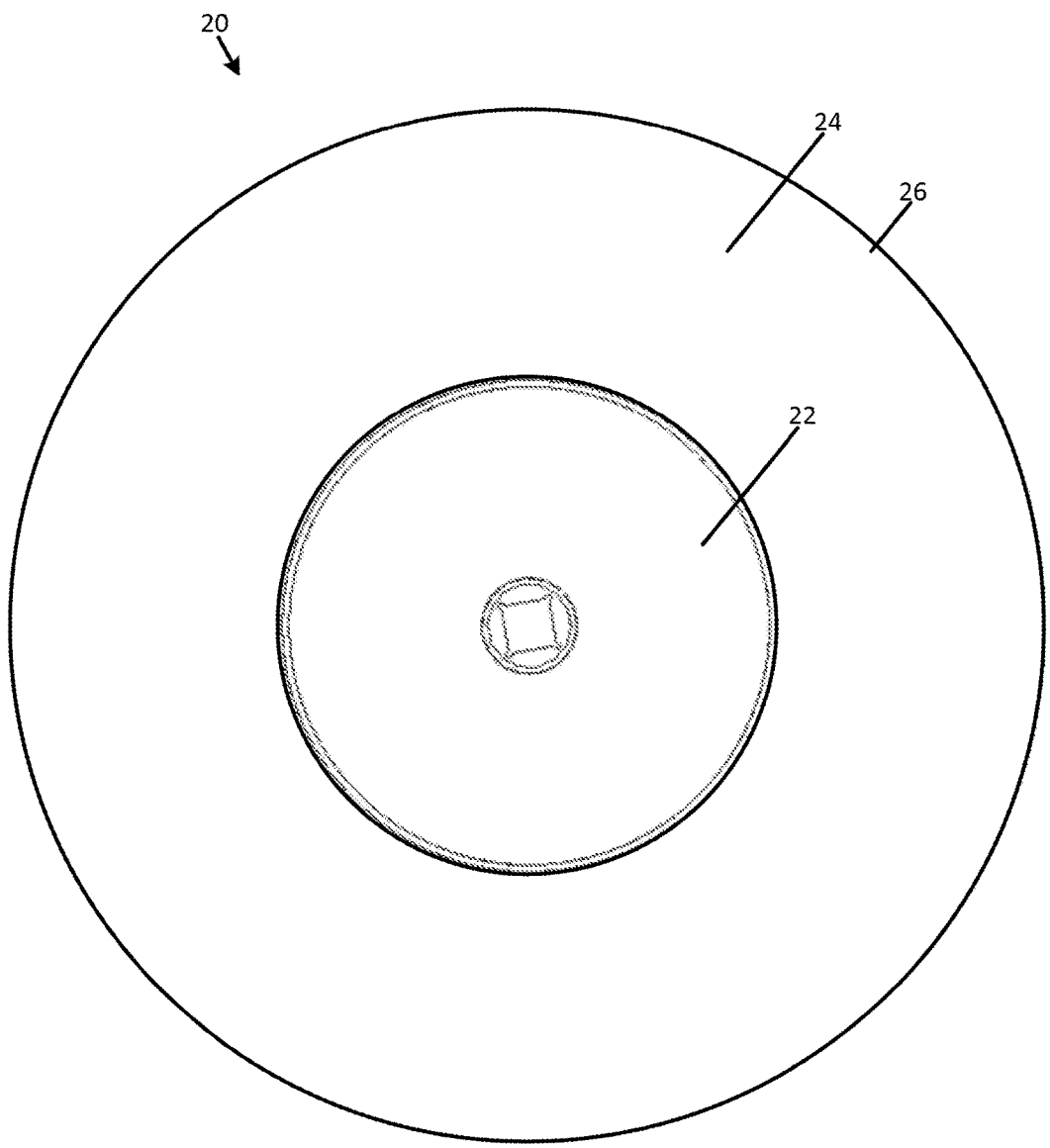
FIG. 1 shows a side elevation view of an embodiment of a turbine in accordance with the present disclosure.

FIG. 1 shows a side elevation view of an embodiment of a turbine 20 in accordance with the present disclosure. The turbine 20 has a hub 22 and a pair of sidewalls of which sidewall 24 is shown. Also shown in FIG. 1 is a periphery region 26, which is along the perimeter of the turbine 20.

Figure 2:
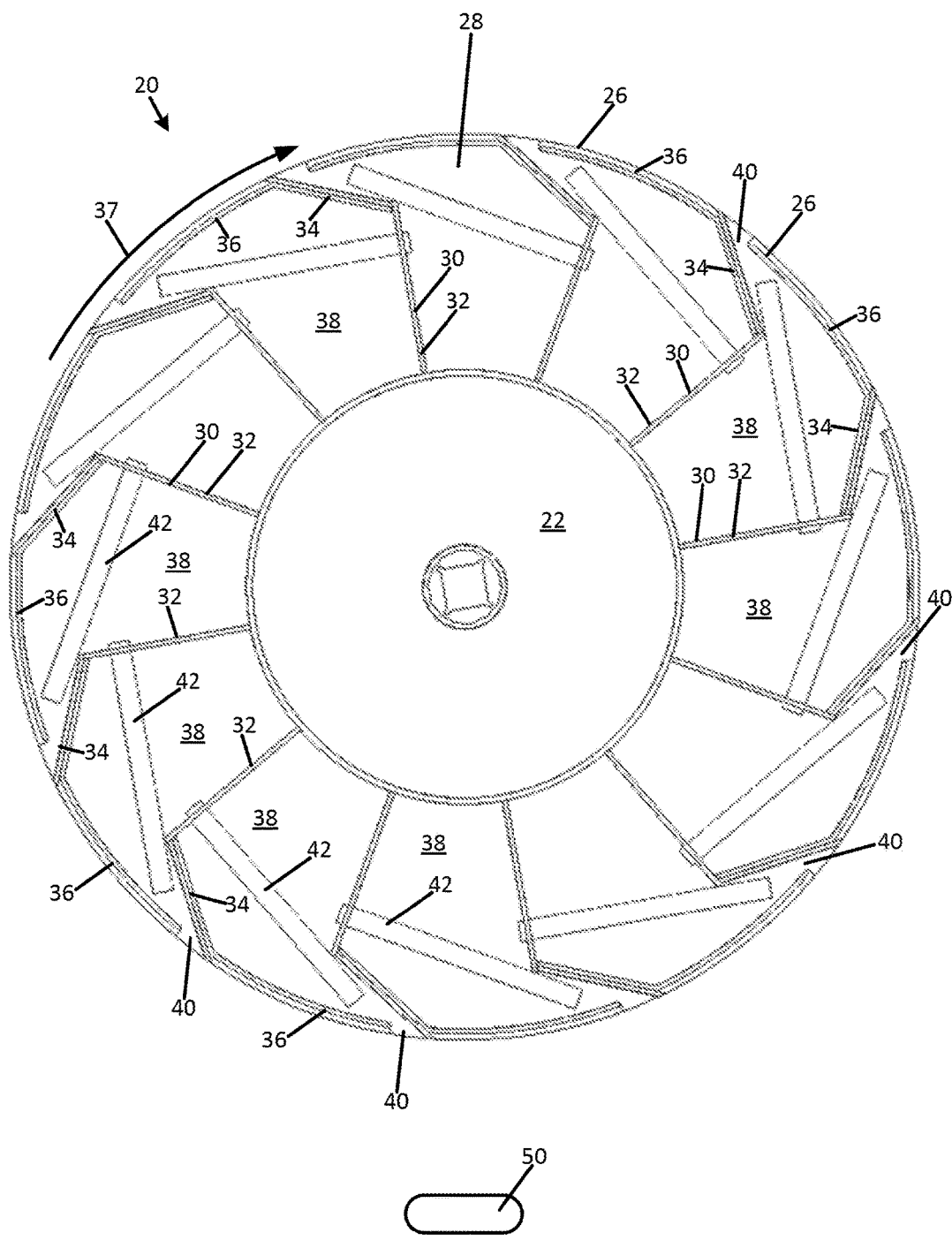
FIG. 2 shows a cutaway side elevation view of the turbine of FIG. 1.

FIG. 2 shows a cutaway view of the turbine 20 with the sidewall 24 of FIG. 1 removed. The other sidewall 28 is shown in FIG. 2.

The turbine 20 has multiple turbine blades 30, which are curved. Each turbine blade 30 in the present embodiment includes three portions, namely portion 32, portion 34, and portion 36. Also, in the present embodiment, the portion 32 and the portion 34 are flat wall portions and, the portion 34 is a curved wall portion. Together, the portions 32, 34, and 36 form a turbine blade 30, which is curved. Each turbine blade 30 extends from the hub 22 toward the periphery region 26 of the turbine 20.

In FIG. 2, portion 32 is connected to the hub 22; portion 34 is connected to portion 32; and portion 36 is connected to portion 34. All the portions 32, 34, and 36 are connected to both sidewall 24 (shown in FIG. 1) and sidewall 28. The sidewalls 24 and 28, the hub 22, and the portions 32, 34, and 36 are all interconnected and form a series of compartments 38. Each compartment 38 has two adjoining compartments 38. That is, each compartment 38 is formed next to two other compartments 38.

In the present embodiment, each compartment 38 has an opening 40 that allows fluids such as, for example, air and water, to flow therethrough. The opening is defined by a portion 36 of a given turbine blade 30 overlapping a portion 34 of a neighbor turbine blade 30. As will be described in more detail below, as gas is released from a gas source 50 located below the turbine 20, the gas rises and some of that gas enters a chamber 38 through an opening 40 associated to that chamber. As gas enters the chamber 38 through the opening 40, liquid present in the chamber 38 is displaced, by the gas, out of the chamber 38. As more gas enters the chamber 38, the chamber becomes more buoyant, produces more torque and, when the torque is sufficient to overcome the mechanical load to which the turbine is connected, makes the turbine 20 turn.

Each compartment 38 includes a conduit 42 that fluidly connects each compartment 38 to an adjoining compartment located in the direction of rotation, which is indicated by, in FIG. 2, arrow 37. This is described in greater detail in relation to the next Figures where a prior art turbine is compared to the embodiment of FIG. 2 of the present disclosure.

Figure 3:
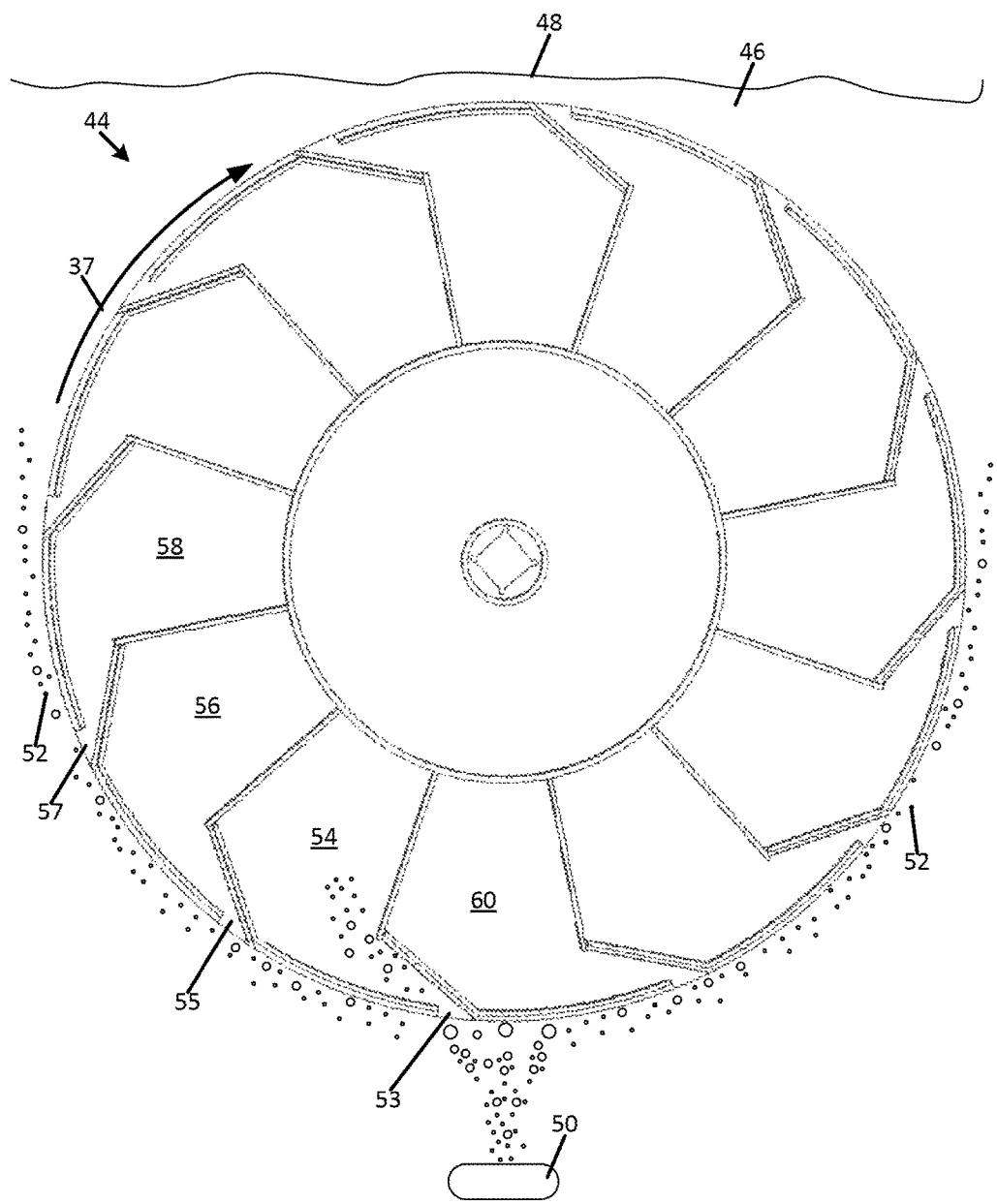
FIG. 3 shows a prior art turbine submerged in liquid.

FIG. 3 shows a prior art turbine 44 submerged in liquid 46 below waterline 48. A gas source 50 is located below the turbine 44 and expresses gas 52, shown as gas bubbles. The gas 52 travels upward and a portion of the gas enters compartment 54 through the opening 53, which causes liquid in the compartment 54 to flow out. The portion of the gas 52 that does not enter the compartment 54 continues its ascension toward the waterline 48. Some of the gas 52 that does not enter the compartment 54 may enter other compartments, for example, compartments 56 and 58, through openings 55 and 57 respectively but, in a lesser quantity than in the compartment 54. The reasons for not having as much gas enter the compartments 56 and 58 include the fact that the openings 55 and 57 are at an angle and offer less of a cross-section for the gas 52 that travels upwards to enter these chambers. Some of the gas 52 that does not enter the chamber 54 may enter the chamber 60 but to a lesser degree still.

Depending on the physical characteristics of the turbine 44 (dimensions, weight, number of compartments, etc.), on the mechanical load on the turbine 44, and on the characteristics of the gas source 50 (rate at which gas is expressed from the gas source, type of gas), the turbine 44 will reach a constant angular speed once the transitory startup phase is done.

In the context of the present disclosure, the mechanical load is the external mechanical resistance against which the turbine acts. The turbine 44 is coupled to the mechanical load through any suitable means. For example, the turbine 44 can be mechanically coupled to an auger and cause the auger to rotate in order to move matter (for example waste) along the rotation axis of the auger. When the mechanical load on the turbine 44 increases, for example, when the weight of the matter to be moved by the auger increases, the angular speed of the turbine can decrease and, in cases where the mechanical load increases beyond the maximum load the turbine can handle, the turbine will stop rotating. In such cases, increasing the rate at which gas 52 (e.g., air) is expressed from the gas source 50 may cause more gas to enter compartment 54 and the turbine to start rotating again. This assumes, on the part of the turbine 44, a margin of operation of the turbine where the turbine can handle the mechanical load (the turbine can turn and keep on turning) even when the compartments do not completely fill with gas when they rotate by the gas source 50.

In such cases, when the angular speed of the turbine decreases, due to an increase of the mechanical load, each compartment rotating pass the gas source 50 receives more gas than when the angular speed is higher. This increase in gas captured in the compartments causes the turbine to develop more torque and the increase in mechanical load can be handled by the turbine 44.

In cases where the turbine 44 can handle the mechanical load (turn) only when each chamber facing the gas source becomes filled with air, then, any increase in the mechanical load will stop the turbine 44 and the turbine will not be able to move the load even if the rate at which air is expressed from the gas source is increased.

Figure 4:
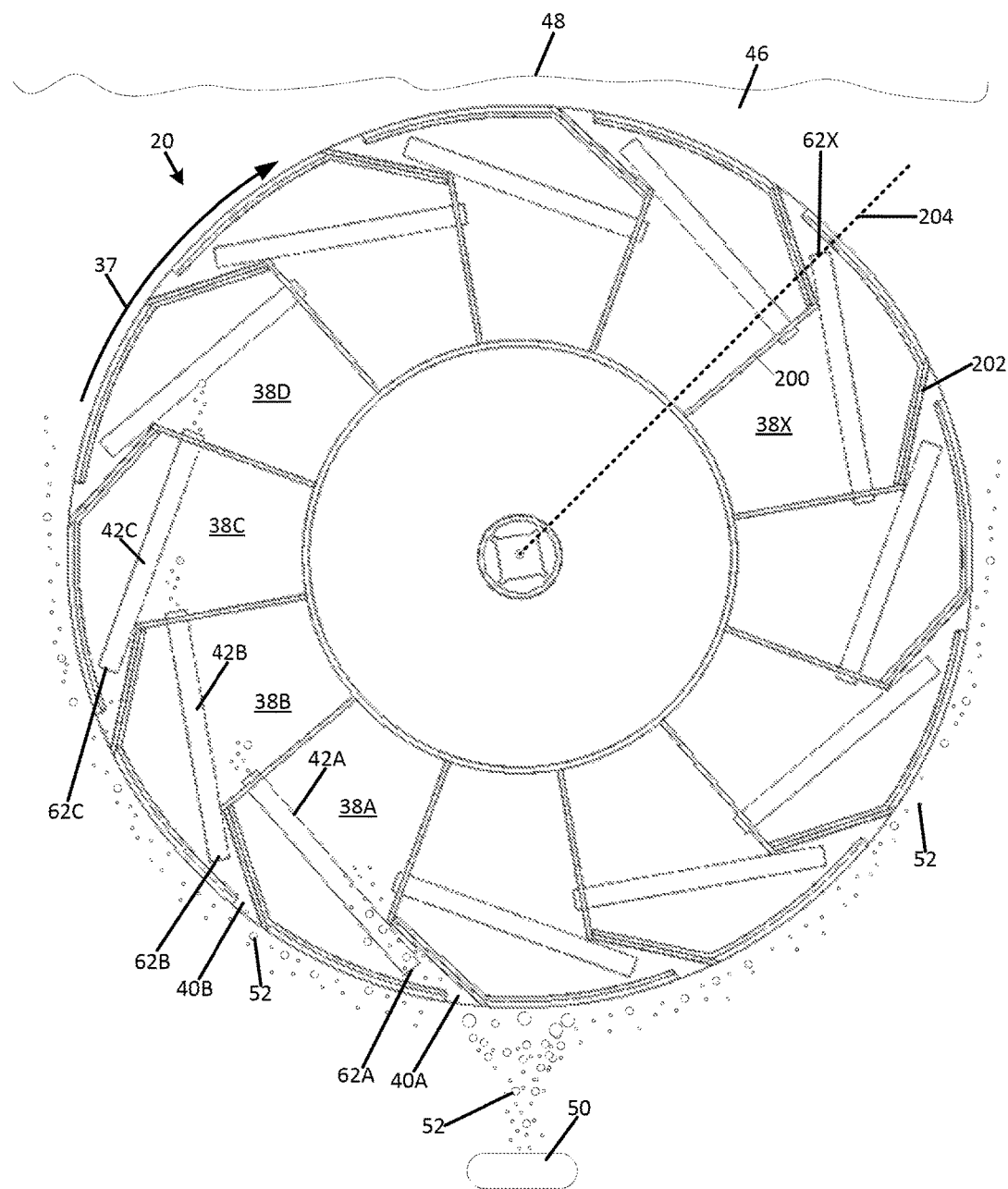
FIG. 4 a cutaway side elevation view of the turbine of FIG. 1 submerged in liquid.

FIG. 4 shows the turbine 20, previously shown at FIG. 2, in operation. In FIG. 4, the turbine 20 is submerged in liquid 46 below waterline 48. A gas source 50 is located below the turbine 20 and expresses gas 52, shown as gas bubbles. The gas 52 travels upward and a portion of the gas 52 enters compartment 38A through the opening 40A, which causes liquid in the compartment 38A to flow out of the compartment.

As gas 52 enters the compartment 38A, it can flow pass an aperture 62A of the conduit 42A and stay in the chamber 38A or, it can enter the conduit 42A at the aperture 62A and flow into the adjoining compartment 38B, which is located in the direction of rotation 37 of the turbine. As gas enters compartment 38B, liquid that may be present in the chamber 38B will flow out of the chamber 38B through opening 40B or through the aperture 62A and the opening 40A. When the compartment 38B is already filled with gas, additional gas 52 entering compartment 38B through the conduit 42A will cause gas from the compartment 38B to enter conduit 42B through the aperture 62B and, from there, flow through the conduit 42B into compartment 38C. When the compartment 38C is already filled with gas, additional gas 52 entering compartment 38C through the conduit 42B will cause gas from the compartment 38C to enter conduit 42C through the aperture 62C and from there, flow through the conduit 42C into compartment 38D.

In the embodiment of FIG. 4, each conduit has as an aperture that is located in between two adjacent curved blades, along a radial direction of the turbine. For example, aperture 62X is located in compartment 38X between curved turbine blades 200 and 202, along a radial direction 204 of the turbine 20.

Having each compartment connected to its adjoining compartments, as shown in the present embodiment, i.e. having each compartment in fluid communication with its two adjoining compartments, provides a margin of operation for the turbine 20. For instance, when the turbine 20 is subjected to a mechanical load it cannot handle, the turbine 20 will stop, for example, in the position shown at FIG. 4. In this scenario, compartment 38A will become filled with gas 52 and some gas will also partially fill compartment 38B. If having compartment 38A filled with gas and compartment 38B partially filled with gas does not provide sufficient torque for the turbine 20 to overcome the mechanical load (i.e. if the turbine 20 does not start turning), the turbine 20 will stay immobile and gas 52 will continue to enter chamber 38B. As chamber 38B becomes filled with gas, additional gas entering compartment 38B will cause camber 38C to receive gas 52 from compartment 38B, through conduit 42B. And so on. Eventually, as will be understood by the skilled worker, for a properly designed turbine, the torque developed by the turbine 20 under the buoyancy force provided by the gas filling compartments will cause the turbine 20 to re-start turning.

As such, in cases where the prior art turbine 44 and the turbine 20 have the same dimensions and characteristics, except for the turbine 20 having conduits fluidly connecting adjoining compartments, the turbine 20 will be able to handle greater mechanical loads than turbine 44 for a given rate of gas expressed from the gas source 50.

The exemplary turbine 20, as shown in FIG. 2, comprises a plurality of compartments 38 (in this example, twelve) that each has associated thereto an opening 40. The openings 40 each define a fluid communication path between the chamber to which it is associated and the outside of the turbine 20. With reference to FIG. 4, the chamber 38A has associated thereto the opening 40A, which allows fluid (gas and/or liquid) to flow between the chamber 38A and the outside of the turbine.

With reference to FIG. 2, the turbine 20 also comprises a plurality of conduits 42 (in this example, twelve). Each conduit connects a compartment to an adjoining compartment. For example, with reference to FIG. 4, the conduit 42A connects the compartment 38A to the compartment 38B. Each conduit defines a fluid communication passageway between adjoining compartments. That is, fluid such as gas and liquid can flow between, for example, the adjoining compartments 38A and 38B through the conduit 42A. The conduits can have any suitable configuration (for example, rigid or flexible pipes or hoses) and be made of any suitable material (for example, plastic or metal).

The exemplary turbine 20 comprises twelve compartments and twelve conduits. However, turbines having any suitable number of chambers and conduits are within the scope of the present disclosure. Further, even though each compartment of the exemplary turbine 20 has a conduit connecting the compartment in question to an adjoining compartment, this need not be the case. For example, turbines with compartments having a conduit connecting a respective compartment to the compartment's second or third or $n^{th}$ neighbor compartment are also within the scope of the present disclosure. Furthermore, turbines having only some of its compartments connected, through a conduit, to another compartment are also within the scope of the present disclosure.

Figure 5:
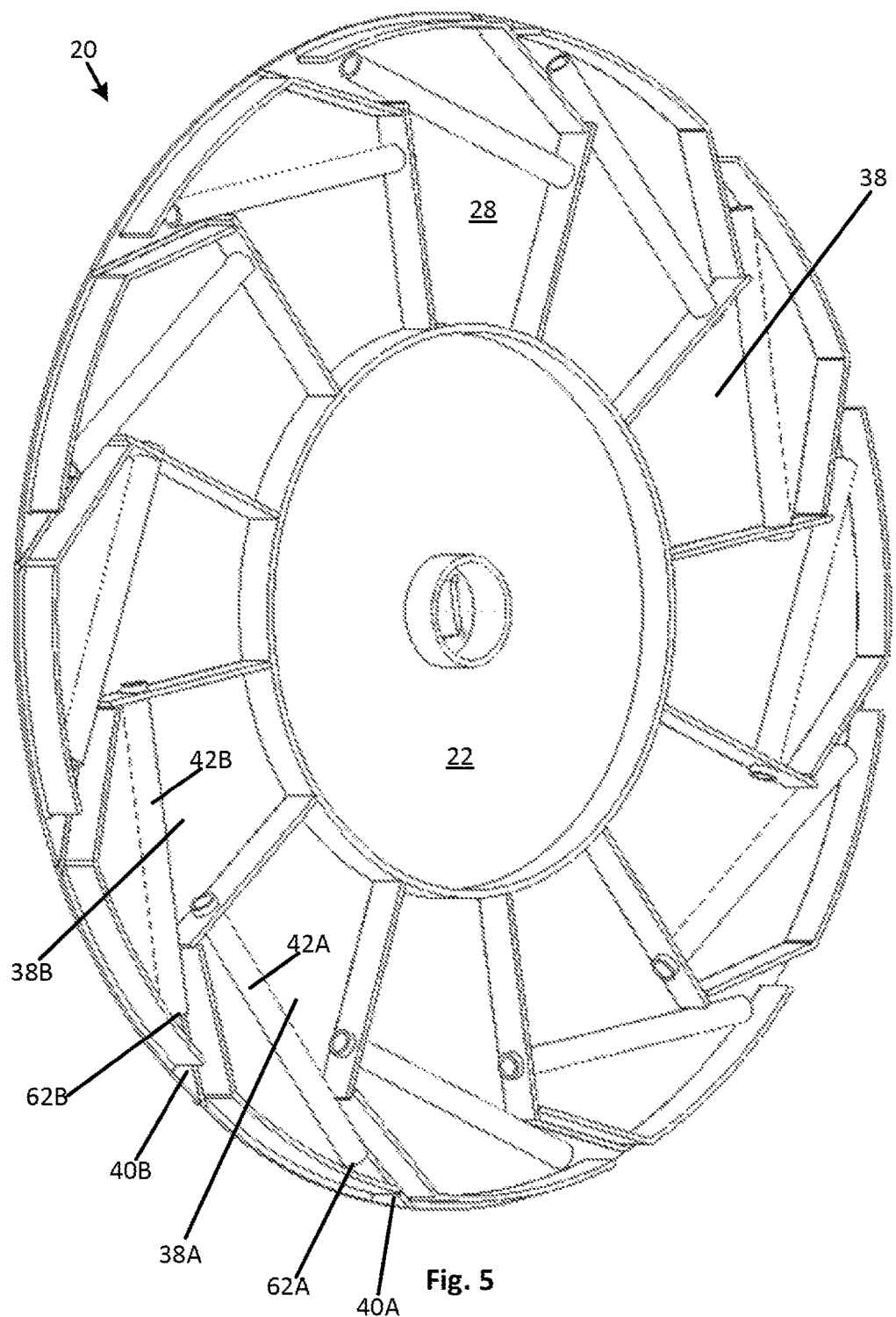
FIG. 5 shows a cut away perspective view of the turbine of FIG. 2.

FIG. 5 shows a cutaway side perspective view of the turbine 20 of FIG. 4.

Figure 6:
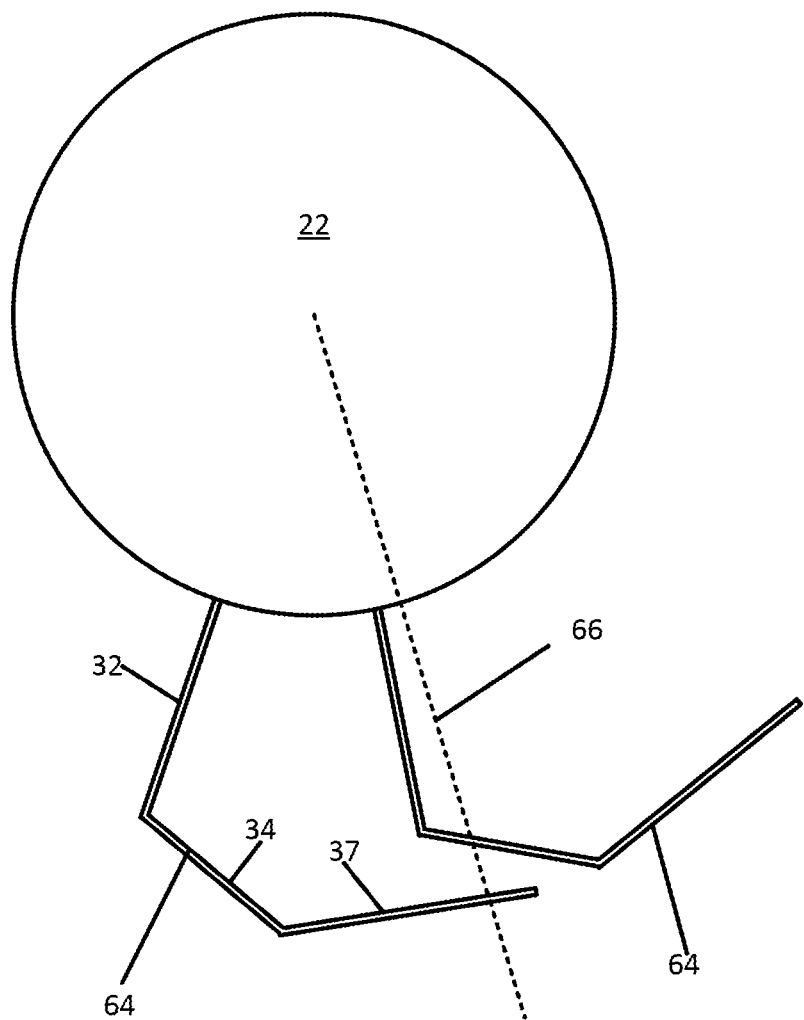
FIG. 6 shows curved turbine blades connected to a hub of a turbine in accordance with an embodiment of the present disclosure.

With respect to the curved blades 30 shown at FIG. 2, and without departing from the scope of the present disclosure, the portion 36, rather than being a curved wall portion, can be a flat wall portion 37 shown in FIG. 6. In this case, the turbine blades are piecewise linear curved blades, shown in FIG. 6 at reference numeral 64. Also shown in FIG. 6 is the hub 22 to which the piecewise curved blades 64 are connected. Additionally, FIG. 6 shows that the two blades 64 overlap each along a radial direction of the hub 22 and of the turbine, the radial direction of the present embodiment being shown as the dashed line 66.

Figure 7:
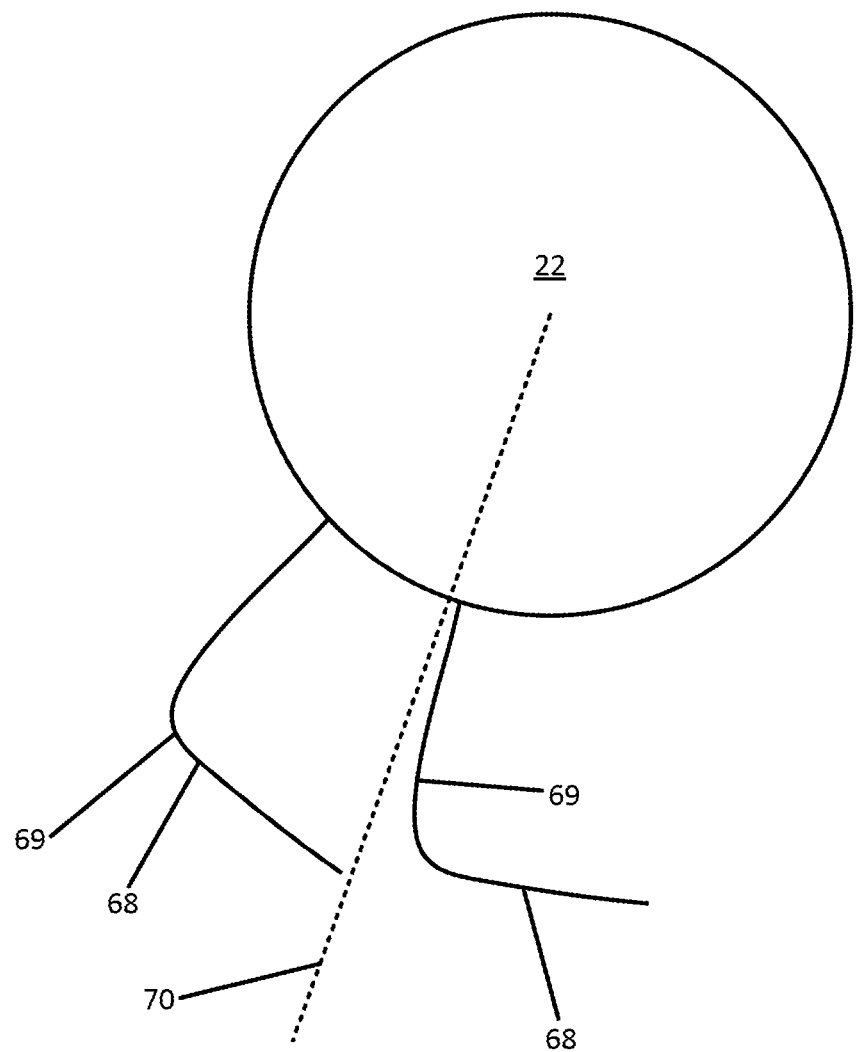
FIG. 7 shows curved turbine blades connected to a hub of a turbine in accordance with another embodiment of the present disclosure.

Curved blades of the turbine do not need to be made of any particular number of portions or have overlapping portions along a radial direction of the turbine. FIG. 7 shows another example of a hub 22 of a turbine to which are connected two curved blades 68 that do not have overlapping portions along a radial direction 70 of the turbine. In this example, each curved blade 68 is a single, curved wall 69.

Figure 8:
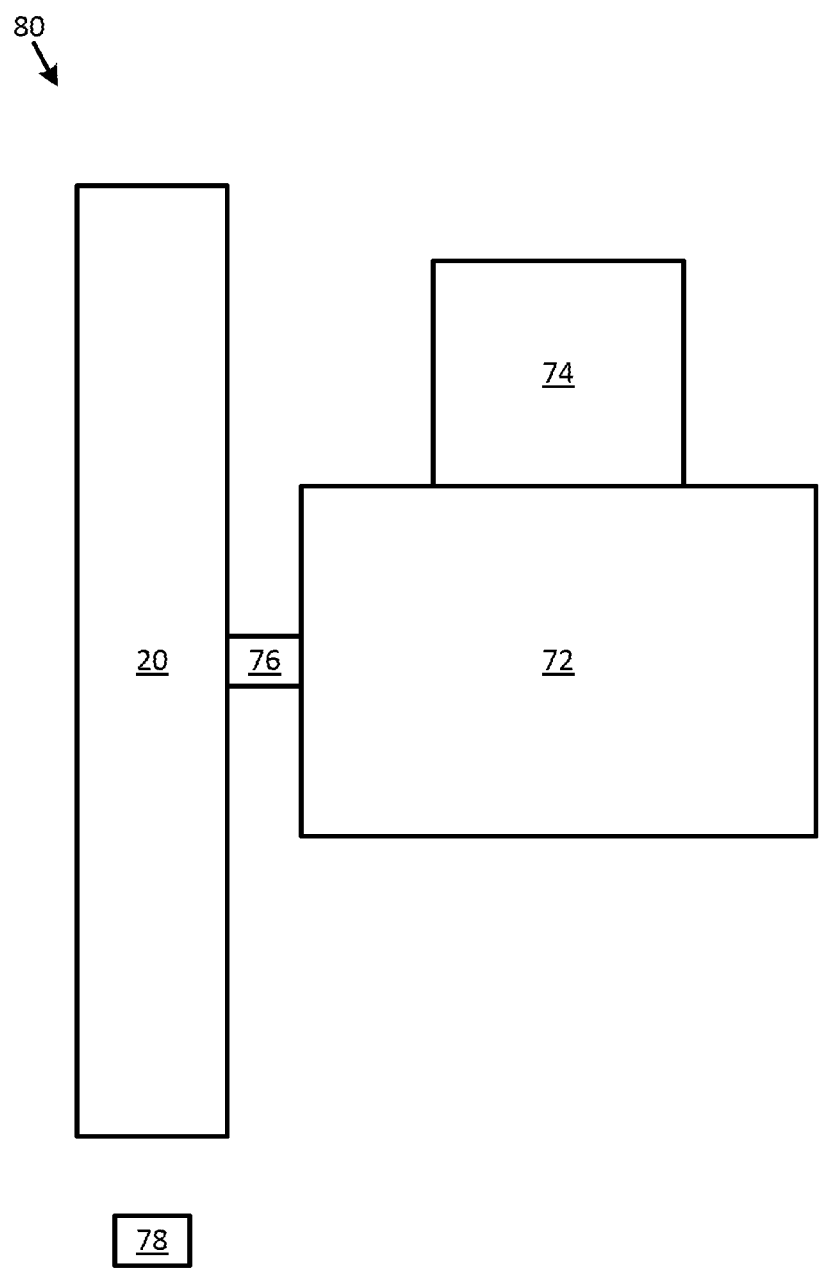
FIG. 8 shows a block representation of a system in accordance with an embodiment of the present disclosure.
Figure 9:
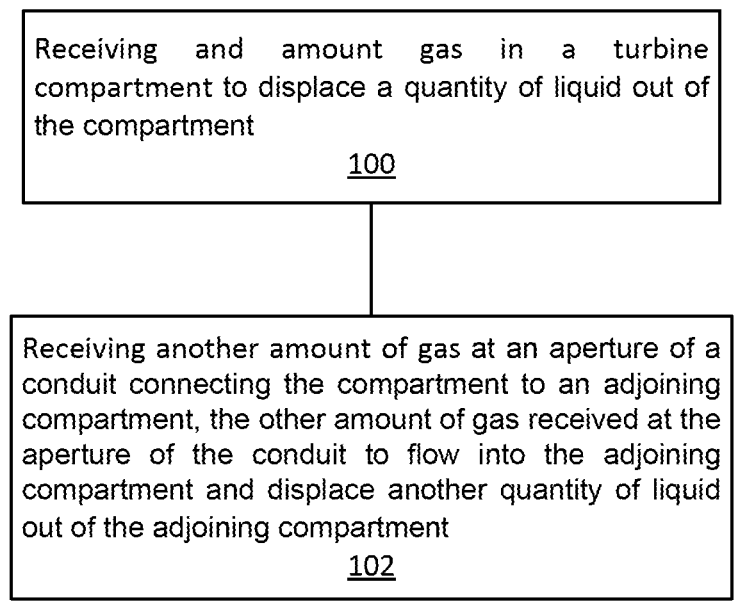
FIG. 9 shows a flowchart of a method in accordance with an embodiment of the present disclosure.

FIG. 8 shows a block diagram representation of a system 80, in accordance with the present disclosure. The system 80 comprises the turbine 20 coupled, through a coupling 76 to an implement 72. The implement 72 is subjected to an implement load 74. A gas source 78 is located under the turbine 20 to provide the gas to the turbine to displace liquid from the compartments of the turbine to an outside of the turbine in order to drive the turbine 20. Not shown in FIG. 9 is the liquid in which the turbine 20 is immerged, either partially or entirely (submerged). The coupling 76 can be any suitable type of coupling such as, for example, a gear coupling, a chain coupling, a belt coupling, a magnetic coupling, etc. and can include an axle. The implement 72 can be any suitable type of implement such as, for example, an auger, an impeller, an electrical generator, etc. The implement load 74 can be any suitable type of external mechanical resistance acting against the implement 72. The mechanical load to which the turbine 20 is subjected is provided by the mechanical resistance provided by the coupling 76, the implement 72 and the implement load 74. The system 20 can be, for example, a wastewater treatment system.

The turbine of the present disclosure can be made of any suitable materials such as, for example, polypropylene, polyethylene, polycarbonate, HDPE, plastic/resin mixtures etc. The components of the turbine can be secured to each other through any suitable means such as epoxies fasteners etc. The turbine can have any suitable size. As an example, the diameter of the turbine can be 70 cm and the thickness of the turbine can be 15 cm. Any other size is to be considered as being within the scope of the present disclosure.

FIG. 9 shows a flowchart of a method in accordance with an embodiment of the present disclosure. As action 100, an amount of gas is received in a turbine compartment. For example, with reference to FIG. 4, an amount of gas is received in the compartment 38A. This amount of gas displaces a quantity of liquid out of the compartment. Referring again to FIG. 9, at action 102, another amount of gas is received at an aperture of a conduit connecting the compartment to an adjoining compartment. Referring back to FIG. 3, the conduit can be conduit 42A and the aperture of the conduit can be the aperture 62A. The other amount of gas received at the aperture of the conduit to flows into the adjoining compartment and displaces another quantity of liquid out of the adjoining compartment. The adjoining compartment can be compartment 38B.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

The above-described embodiments are intended to be examples only. Alterations, modifications and variations can be effected to the particular embodiments by those of skill in the art. The scope of the claims should not be limited by the particular embodiments set forth herein, but should be construed in a manner consistent with the specification as a whole.

What is claimed is:

1. A turbine comprising:
a plurality of compartments, each of the plurality of compartments having associated thereto a respective opening, each respective opening defining a fluid communication path between an outside of the turbine and a respective one of the plurality of compartments; and
a plurality of conduits, each associated with a respective one of the plurality of compartments, each of the plurality of conduits connecting a respective one of the plurality of compartments to an adjoining one of the plurality of compartments, each of the plurality of conduits defining a fluid communication passageway between the respective one of the plurality of compartments and the adjoining one of the plurality of compartments, the turbine configured for immersion in liquid and for powering by gas displacing some of the liquid out of one or more than one compartment of the plurality of compartments,
wherein each conduit of the plurality of conduits defines a first aperture and a second aperture, the first aperture being located in a first compartment of the plurality of compartments and the second aperture being located in a compartment of the plurality of compartments adjoining the first compartment of the plurality of compartments.

2. The turbine of claim 1 further comprising a plurality of curved blades, each opening being defined by a curved blade of the plurality of curved blades extending over an adjacent curved blade of the plurality of curved blades, along a radial direction of the turbine.

3. The turbine of claim 1 further comprising a hub, each curved blade of the plurality of curved blades extending from the hub towards a periphery region of the turbine.

4. The turbine of claim 3 further comprising two opposite sidewalls, each sidewall being connected to each curved blade of the plurality of curved blades, each compartment of the plurality of compartments being defined by a pair of adjoining curved blades of the plurality of curved blades, by the two opposite sidewalls, and by the hub.

5. The turbine of claim 1 wherein the plurality of conduits includes at least one of a pipe and a hose.

6. The turbine of claim 1 wherein the liquid in which the turbine is configured to be immersed includes water and the gas by which the turbine is configured to be powered includes air.

7. A turbine comprising:
a plurality of compartments, each of the plurality of compartments having associated thereto a respective opening, each respective opening defining a fluid communication path between an outside of the turbine and a respective one of the plurality of compartments;
a plurality of conduits, each associated with a respective one of the plurality of compartments, each of the plurality of conduits connecting a respective one of the plurality of compartments to an adjoining one of the plurality of compartments, each of the plurality of conduits defining a fluid communication passageway between the respective one of the plurality of compartments and the adjoining one of the plurality of compartments, the turbine configured for immersion in liquid and for powering by gas displacing some of the liquid out of one or more than one compartment of the plurality of compartments, and
a plurality of curved blades, wherein each conduit of the plurality of conduits defines a first aperture and a second aperture, each first aperture located in a first compartment of the plurality of compartments between two adjacent curved blades of the plurality of curved blades, along a radial direction of the turbine, each second aperture being located in a second compartment of the plurality of compartments, the second compartment adjoining the first compartment.

8. The turbine of claim 7 wherein each curved blade of the plurality of curved blades is a piecewise linear curved blade that has multiple flat wall portions.

9. The turbine of claim 7 wherein each curved blade of the plurality of curved blades comprises a plurality of flat wall portions.

10. The turbine of claim 9 wherein each curved blade of the plurality of curved blade includes one or more than one curved wall section.

11. A system comprising:
the turbine as defined in claim 1;
a gas source, the gas source to be located under the turbine to provide the gas to the turbine to displace water from the plurality of compartments to the outside of the turbine in order to drive the turbine; and
an implement coupled to the turbine.

12. The system of claim 11 wherein the implement includes an auger for displacing matter.

13. The system of claim 12 wherein the system is a wastewater treatment system.

* * * * *